Feb. 4, 1941.    C. P. POTTS    2,230,906
TIRE PRESSURE INDICATOR
Filed July 11, 1939    4 Sheets-Sheet 1
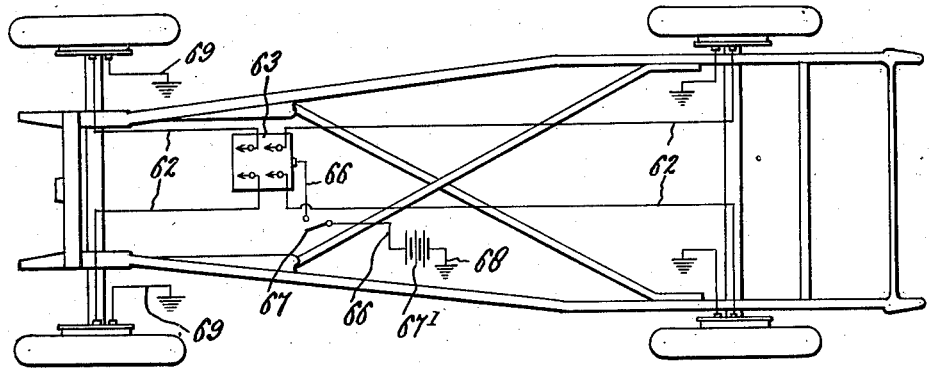
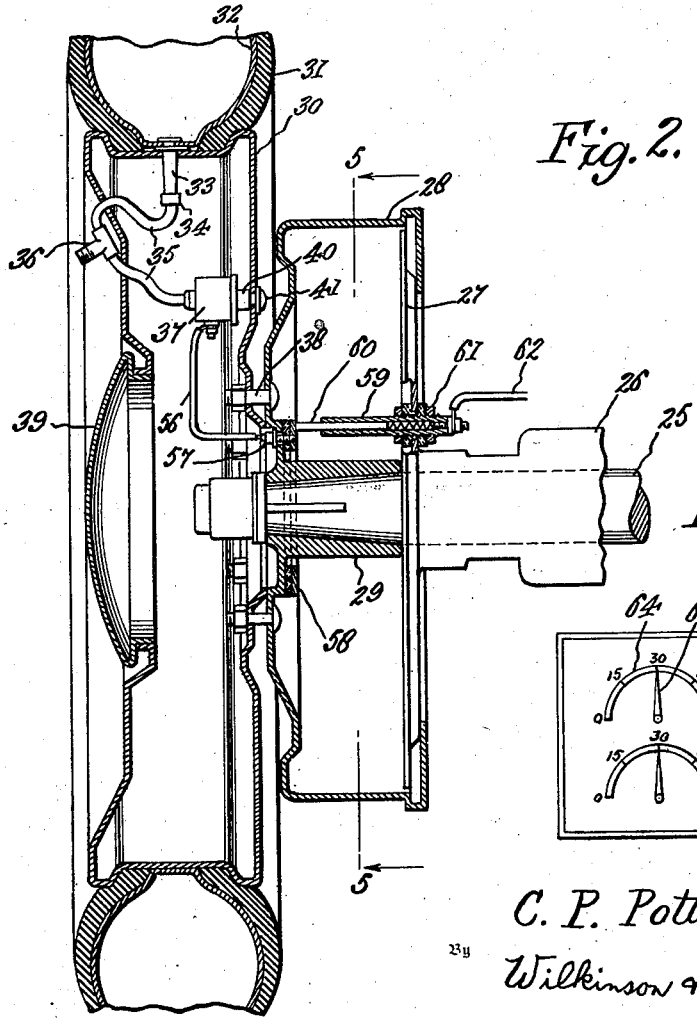
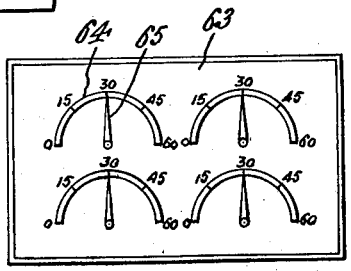
Inventor
C. P. Potts
By Wilkinson & Mawhinney
Attorneys.

Feb. 4, 1941. C. P. POTTS 2,230,906
TIRE PRESSURE INDICATOR
Filed July 11, 1939 4 Sheets-Sheet 3

Inventor
C. P. Potts
By Wilkinson & Mawhinney
Attorneys.

Feb. 4, 1941.    C. P. POTTS    2,230,906
TIRE PRESSURE INDICATOR
Filed July 11, 1939    4 Sheets-Sheet 4

Inventor
C. P. Potts
By Wilkinson & Mawhinney
Attorneys.

Patented Feb. 4, 1941

2,230,906

UNITED STATES PATENT OFFICE 2,230,906

TIRE PRESSURE INDICATOR

Clarence Poe Potts, Macon, Ga.

Application July 11, 1939, Serial No. 283,921

2 Claims. (Cl. 177—351)

The present invention relates to a tire pressure indicator and more particularly to a tire indicator system for showing on the instrument board, or other suitable position of visual inspection, the air pressure condition of the tires of the vehicle.

An object of the present invention is to provide an electric transmitter or pressure unit disposed in the wheel body supporting the tire and which is removable with the wheel body when separated from the hub so that the unit may be coupled substantially directly with the tires and their wheel bodies may be quickly interchanged in the usual manner without the exercise of undue skill.

Another object of the invention is to provide electric tire pressure indicating means wherein the transmitter unit is carried in the wheel body and grounded at one side therethrough into the vehicle and at its other side is connected by a wire which may be quickly and easily connected and disconnected from a binding post or the like carried upon the wheel hub or brake drum.

Another object of the invention is to provide a flexible connection between the tire valve stem and the pressure unit and also provide a tire inflation valve in the connection conveniently located at the outer side of the wheel body so that access may be readily had thereto for inflating the tire without disturbing the connection between the tire and the pressure unit.

Another feature of the invention is a modified construction of a transmitter or pressure unit adapting it to the particular application and combination of this invention so that the pressure unit may be mounted in the wheel body and admit of the advantages above pointed out.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a plan view of a motor vehicle chassis, showing a tire pressure indicating system embodying the features of this invention.

Figure 2 is a fragmentary vertical central section taken through a vehicle wheel with a tire thereon and showing the mounting and connections of the transmitter or pressure unit on the wheel body and connected to the tire.

Figure 3 is a detail face view of the indicator panel, showing the tire pressure indicators.

Figure 4:
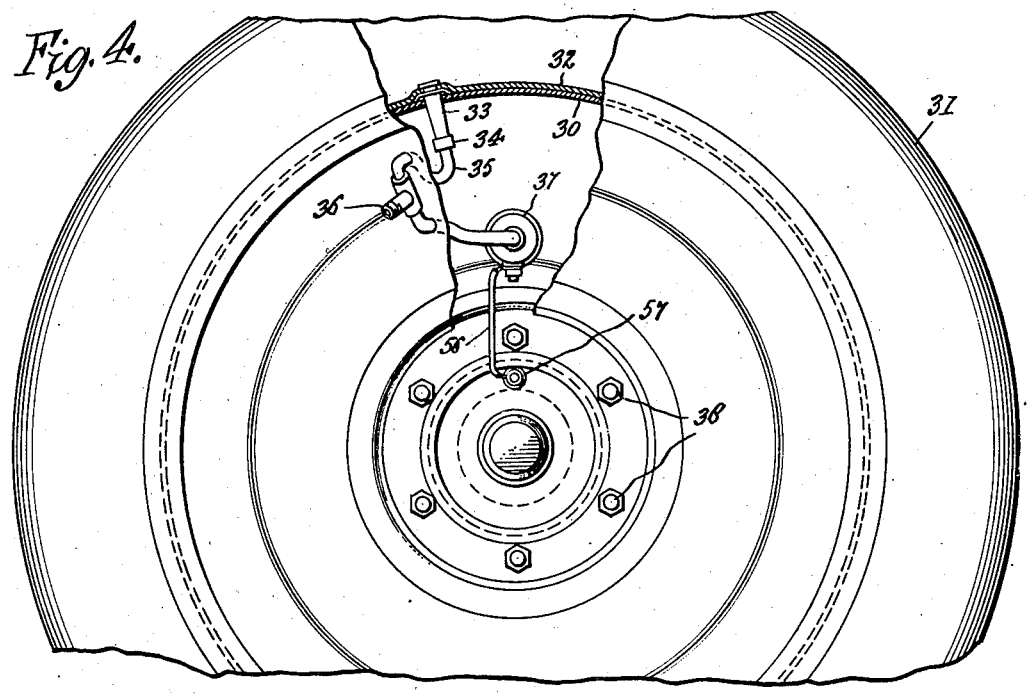
Figure 4 is a fragmentary outer side view of the wheel and tire of Figure 2, parts being broken away to show the transmitter unit in position.
Figure 5:
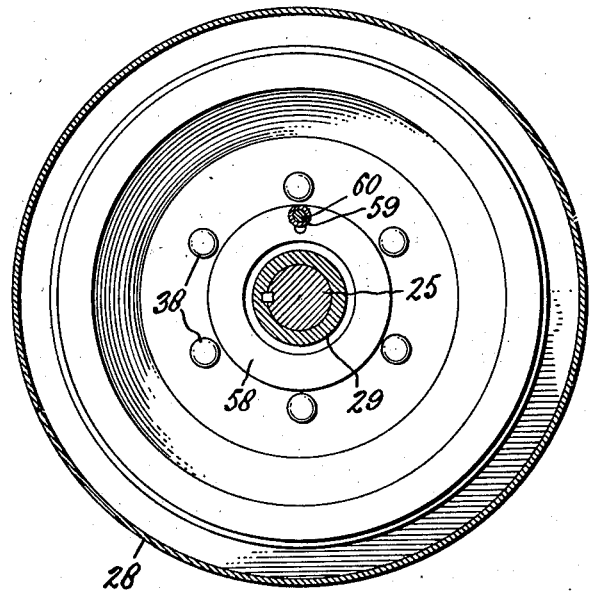
Figure 5 is a transverse section taken on the line 5—5 of Figure 2 looking toward the inner side of brake drum and showing the contact brush in position therein.
Figure 6:
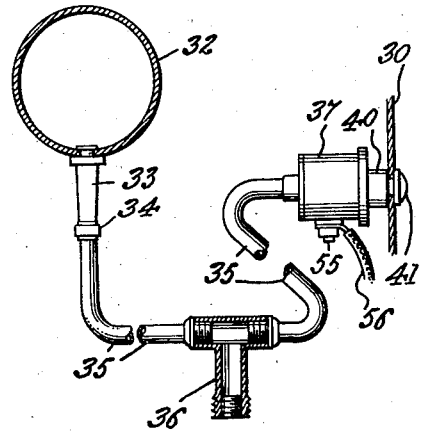
Figure 6 is a detail enlarged sectional view showing diagrammatically the connection between the innertube of the tire and the pressure unit with the tire inflation valve interposed between the same.
Figure 7:
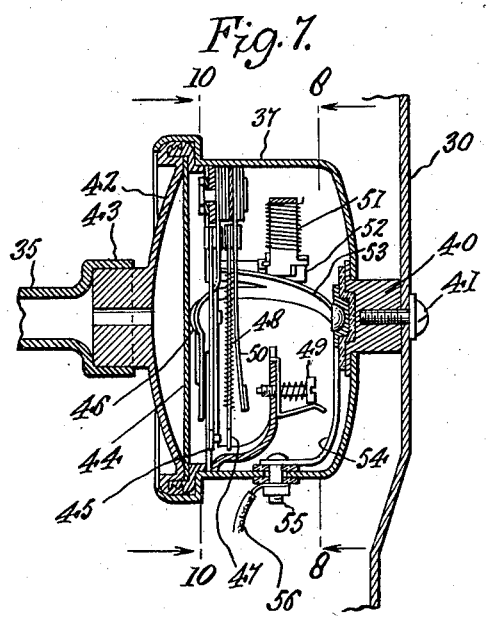
Figure 7 is a detail enlarged sectional view taken through the electric transmitter or pressure unit, showing the same mounted on the wheel body.

Referring to the drawings and first to Figures 1 to 6, 25 designates a vehicle axle mounted in the usual manner in a housing 26 which is stationary on the vehicle and which carries a dust cap or closure plate 27 fitting into the open inner side of a brake drum 28. The brake drum 28 is mounted on the hub 29 of a wheel which is keyed or otherwise suitably fixed upon the shaft 25. Detachably carried upon the hub and brake drum structure, which will hereafter be referred to as the hub, is a wheel body 30 of any suitable construction, such as sheet metal and which is provided in the usual manner with a pneumatic tire 31 in which is placed an innertube 32 having a valve stem 33 projecting radially inward through the peripheral tire seat of the wheel body 30. At the present time the valve stems 33 are usually curved or otherwise constructed to terminate at the outer side of the wheel body 30 so that access may be readily had thereto for controlling the inflation and pressure of the tire.

According to the present invention the valve stem 33 is detachably connected by a coupling nut 34 with a rigid tube 35 which is looped outwardly from the valve stem 33 through the outer wall of the wheel body 30 and is there provided with a T-coupling 36 the stem of which constitutes a valve stem to which may be applied the hose of a pump or suitable source of air pressure supply for inflating the innertube 32. From the T-coupling 36 the rigid tube 35 is carried backwardly through the outer wall of the wheel body 30 and is connected to the base portion of a pressure or transmitter unit 37 which is mounted directly in the wheel body 30 adjacent the valve stem 33 and outwardly of the attaching bolts 38 so that free access may be had thereto in the usual manner upon the removal of the wheel cap 39 which closes the outer side of the wheel body.

While any suitable type of transmitter or pressure unit 37 may be employed one type is shown in Figures 7 to 10. The casing of the pressure unit 37 has an outer or top portion through which a combined grounding and supporting post 40 is secured, the latter being secured by a screw 41 or the like to the rear wall of the wheel body 30 so that when the wheel body is removed from the hub the pressure unit and its connections with the innertube may be removed as a part thereof. The base or inner side of the pressure unit 37 has a convex rear wall 42 with a centrally disposed attaching nipple 43 communicating with the interior of the rear wall 42 and adapted for connection with one end of the flexible hose 35 as shown to advantage in Figures 2, 4, 6 and 7. A diaphragm 44 is fitted against the inner side of the rear wall 42 and provides therewith a pressure chamber to which the air pressure of the innertube 32 is transmitted through the tube 35.

Arranged within the casing of the pressure unit 37 is a flexible contact 45 which is provided with a bearing finger 46 which is depressed toward the central portion of the diaphragm 45 and adapted to bear thereagainst so that upon flexing of the diaphragm under pressure the finger 46 is moved outwardly and advances the flexible contact 45 toward a second flexible contact 47 for engaging the latter and closing an electrical circuit. The contact 47 is bi-metallic and is provided with a resistance coil 48 thereon which is included in the circuit closed by the contacts 45 and 47 so as to heat the latter and cause it to bend away from the contact 45 to break the circuit after the same has been closed for a period of time sufficient to warp or bend the contact 47 toward its circuit open position. The movement of the contact 47 is controlled by a set screw 49 or other suitable adjusting means, preferably through the medium of a spring arm 50 as shown.

Figure 9:
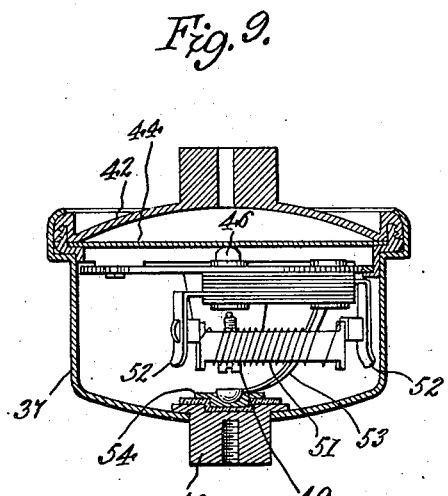
Figure 9 is a horizontal section taken through the same on the line 9—9 of Figure 8.
Figure 8:
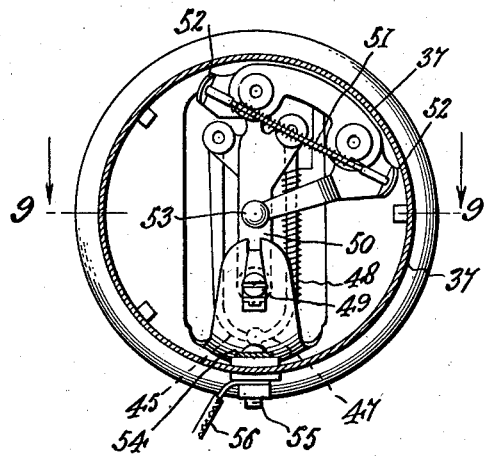
Figure 8 is a transverse section taken through the same on the line 8—8 of Figure 7.
Figure 10:
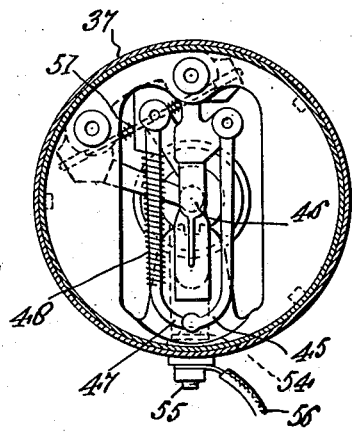
Figure 10 is a transverse section taken on the line 10—10 of Figure 7 through the base portion of the transmitter unit.
Figure 11:
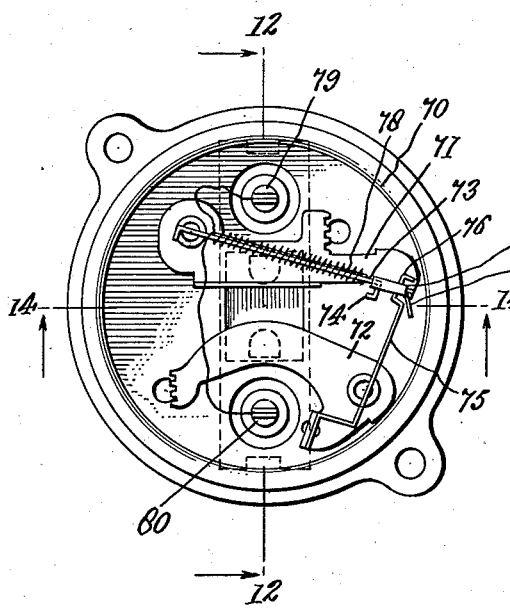
Figure 11 is a detail outer side elevation of one of the indicator or gauge units adapted to be mounted behind the panel shown in Figure 3.
Figure 13:
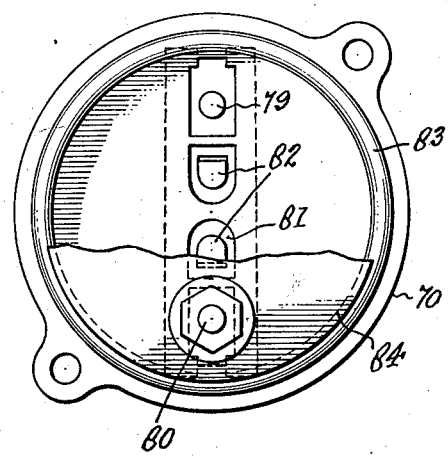
Figure 13 is a rear side elevation of the indicator unit showing the back insulating plate partly broken away.
Figure 12:
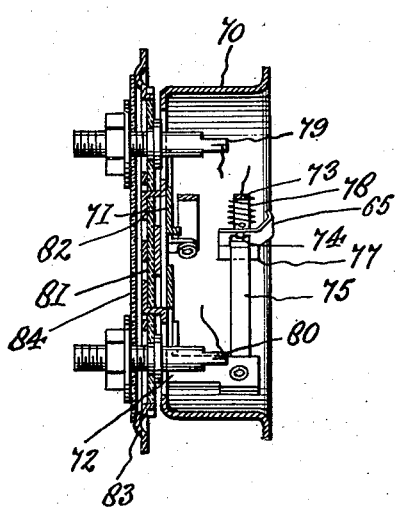
Figure 12 is a vertical section taken through the same substantially on the line 12—12 of Figure 11.
Figure 14:
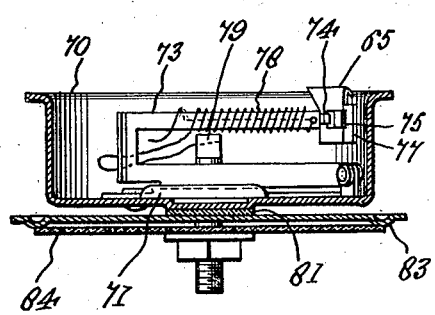
Figure 14 is a horizontal section taken through the same on the line 14—14 of Figure 11.

In order to reduce the effectiveness of the current through the instrument a suitable resistance coil 51 is mounted in the circuit between a pair of spring clamps 52 as shown in Figure 9, and suitable insulation is provided between the parts to cause the circuit to travel therethrough as desired. The ground side of the circuit may be taken off from a spring arm 53 centrally located within the housing 37 and bearing at its free end against the contact strip 54 which extends down into one side of the casing and is connected to a suitable binding post 55 to which is attached a circuit wire 56, shown in Figures 2 and 4. The general characteristics of this instrument are old and well known in the art and applicant has effected modifications only in the supporting stud 40 and in the ground strip 54 with its binding post 55 so that the instrument may be mounted and separated according to the present invention.

The wire 56 is rigid and is automatically connected, by a nut or the like, to a male receptacle in the form of a binding post 57 mounted on the hub and connected therethrough with a conductor ring 58 secured to the inner side of the hub or brake drum. The dust cap or plate 27 carries therethrough a cylindrical housing 59 in which is slidably mounted a carbon brush 60 urged at all times against the ring 58 by a spring 61 so as to maintain an electrical contact through the ring 58 between the wire 56 and the brush 60 and its housing 59. The exposed end of the housing 59 is connected to a wire 62 which is carried in a convenient manner to the indicator panel on the dash-board of the vehicle, and shown in Figure 3. The brush housing 59 is mounted in insulating relation through the dust plate or cap 27 to prevent grounding of the wire 56.

As shown in Figure 1 the wires 62 from the wheels of the vehicle are carried to the desired point of location of the indicators which are mounted behind a suitable panel 63. There is an indicating device or gauge for each wheel so that the panel 63 carries all of the gauges and is provided upon its face with a separate curved scale 64 for each tire and the scales are traversed by indicator or pointer arms 65 which project through the panel 63 and are disposed at its outer face. By this means the individual tire pressure conditions may be observed at all times when the indicator circuit is closed. The indicators are all connected at one side to a wire 66 which leads to a switch 67, which may be controlled with the general ignition switch, and which is in circuit with one side of the battery 67', the latter being grounded in the usual manner at 68.

The grounding of the transmitter or pressure unit 37 at each wheel is indicated at 69 in Figure 1.

Behind the gauge or indicating panel 63 is mounted a suitable indicator mechanism for co-operation with the respective transmitter or pressure units 37. For the purpose of illustration one form of such indicating device or gauge is shown in Figures 11 to 14. The indicating device comprises a suitable casing 70 of substantially the construction illustrated in the U. S. Patent No. 1,885,052 granted October 25, 1932, to Smulski. The casing is provided with a pair of brackets 71 and 72 pivotally mounted in the bottom of the casing but frictionally retained therein so that the brackets may be swung into various adjusted positions as required. The bracket 71 carries at its pivoted end a bi-metallic arm 73 which extends in the general lengthwise direction of the bracket and is provided with a hook 74 on its free end. The bracket 72 carries a flat spring 75 secured at one end to the bracket at a point offset from the pivot of the bracket so that the swinging of the bracket changes the angular position of the spring in the housing 70. The spring 75 is provided with a hook 76 on its free end, and a link plate 77 is provided with a slot therethrough for receiving the hooks 74 and 76 and the latter engages the opposite sides of the slot. The spring arm 75 is placed under tension when engaged with the link plate 77 so as to maintain the latter taut between the hooks 74 and 76 and thus yieldingly hold the latter in a definite angular position in the housing 70. The pointer arm 65 is connected to this link plate 77. The bi-metallic arm 73 carries a heating or resistance coil 78 which has its terminals connected to the binding posts 79 and 80 which are connected in circuit as shown in Figure 1 so that the heating coil 78 is heated proportionately to and at the same time with the heating coil 48 of the transmitter unit, and the bi-metallic arm 73 is curved or warped proportionately so as to change the angular position of the link plate 77 and move the pointer arm 65 over the scale 64.

The binding posts 79 and 80 are insulated through the base of the casing 70 and support an insulating strip 81 across the rear side of the casing, the strip 81 being held to the casing in any suitable manner such as by overturned lugs 82 and a back supporting plate 83 is fitted against the insulating strip 81 and is suitably slotted to space the back plate from the binding posts 79 and 80. The instrument may be insulated from its support by an insulating disc 84 fitted over the binding posts and disposed against the outer side of the back plate 83. The panel board 63 is suitably slotted to receive the outer portion of the link plate 77 which carries the indicator arm 65. Of course other arrangements and constructions may be resorted to for carrying out the features of this invention.

In operation the innertube 32 is inflated by application of the air pressure hose to the valve stem 36 at the outer side of the vehicle wheel. The pressure at all times is transmitted between the innertube 32 and the pressure unit 37 by means of the flexible tube 35. The air pressure in the tube 35, when sufficiently great, flexes the diaphragm 44 which moves the contact 45 into engagement with the contact 47 so as to close a circuit through the heating coil 48 and at the same time closes the heating coil 78 of the gauge in the same circuit and thus uniformly heats both of the coils. The bi-metallic arms 47 and 73 are simultaneously warped or bent under the thermal action and the indicator arm 65 is correspondingly moved until the action ceases, or until the bi-metallic arm 47 bends sufficiently away from the contact 45 to break the circuit. At this time the indicator arm 65 ceases to travel and the bi-metallic elements cool off to the extent of where the contacts 45 and 47 are again brought into electrical engagement with each other. As the pressure on the diaphragm 44 increases the contact 45 is proportionately advanced outwardly toward the contact 47 so that the greater the pressure the less time will be required for the circuit to be again completed when the bi-metallic elements cool. Thus, the pressure condition of the air in the tire tube 32 is constantly indicated on the panel board 63 as long as the main switch 67 of the indicator circuit is closed. It is thus evident that the operator of a motor vehicle will see at all times the condition of the air pressure in the tire and may thus maintain equal pressure in the tires and also immediately observe any leakage or differences in pressure which impair the operation of the vehicle.

When it is desired to change a tire, it is only necessary to remove the cap 39 in the usual manner and apply the wrench to the nuts on the bolts 38 for removing the nuts to free the wheel body from the hub. The wheel body may now be moved from the hub and the transmitter or pressure unit 37 is carried with the wheel body as a part thereof so that the connection between the pressure unit, the valve 36 and the valve stem 33 of the innertube is not disturbed. Of course when the tire is removed from the wheel body or rim the coupling nut 34 may then be released from the valve stem so that the tire may be easily removed without injury to the apparatus. This latter operation may be carried on however after the wheel body 30 has been removed from the hub and where easy access may be had to the coupling nut 34.

The apparatus thus comprises but relatively few parts so mounted that due to the automatic connection between the parts 56 and 57 their connections are not disturbed upon the interchange of wheels and wherein the number of parts is relatively few and wherein the wire 56 should it become broken or worn may be readily replaced without any appreciable expense or exercise of skill in the replacement.

It is obvious that various changes and modifications may be made in the details of construction and design of the above specifically described embodiment of this invention without departing from the spirit thereof, such changes and modifications being restricted only by the scope of the following claims:

What is claimed is:

1. In a tire pressure indicator, the combination with a wheel hub having a wheel body thereon and a valved tire on the wheel body of a transmitter pressure unit carried by the wheel and having a diaphragm with a pressure chamber on one side thereof in communication with the valve of the tire, said unit having a flexible contact engaging the diaphragm, a flexible bi-metallic contact mounted for engagement with said first named contact, a resistance heating coil carried by said bi-metallic contact and adapted to be energized by movement of the diaphragm causing engagement of said contacts to heat the bi-metallic contact and thereby cause it to move out of engagement with said first named contact to de-energize the resistance coil, said contacts being adapted for connection in an indicating circuit, a support connected to one of said contacts, a second support connected to the other of said contacts, and a second resistance coil disposed between said supports and adapted to reduce the effectiveness of the currents passing through the contacts and the heating coil.

2. In a tire pressure indicator, the combination of a wheel hub having a removable wheel body thereon and a tire on the wheel body, a binding post mounted on the hub and exposed within the wheel body and adapted for connection in an indicating circuit, a transmitter pressure unit having a diaphragm therein and a chamber at the side of the diaphragm connected with the valve stem of the tire, said pressure unit having an enclosing casing with a supporting stud at its outer end secured to the inner wall of the wheel body to support the pressure unit and electrically ground the same, a binding post mounted in one side of said casing of the pressure unit and connected to the other side of the circuit thereof, and a conductor between said binding posts of the hub adapted to be removed therefrom when the wheel body is removed from the hub, said unit including a flexible contact having a bearing finger depressed toward the central portion of the diaphragm and adapted to bear thereagainst, a second flexible contact mounted for engagement by the first flexible contact and being bi-metallic and having a resistance coil thereon, a pair of spaced spring clamps, a resistance coil between said clamps, a contact strip in the casing and extending down one side of the casing and connected to the binding post in the casing, and a spring arm centrally located within the casing and bearing at its free end against the contact strip.

CLARENCE POE POTTS.